United States Patent [19]

Baker

[11] Patent Number: 4,871,143

[45] Date of Patent: Oct. 3, 1989

[54] GATE VALVE WITH SUPPLEMENTAL ACTUATOR

[75] Inventor: Gerald S. Baker, Houston, Tex.

[73] Assignee: Cameron Iron Works USA, Inc., Houston, Tex.

[21] Appl. No.: 310,696

[22] Filed: Feb. 15, 1989

[51] Int. Cl.$^4$ .................... F16K 31/122; F16K 31/52
[52] U.S. Cl. .................................. 251/58; 74/54; 74/56; 74/110; 92/14; 92/65; 92/130 B; 251/63.6; 251/243; 251/244; 251/246; 251/263
[58] Field of Search .................. 92/14, 65, 130 B; 74/54, 56, 110; 251/58, 63.5, 63.6, 229, 232, 243, 244, 246, 263, 238, 239, 240, 241

[56] References Cited

U.S. PATENT DOCUMENTS

| | | | |
|---|---|---|---|
| 3,812,766 | 5/1974 | Weiss | 92/14 |
| 4,070,002 | 1/1978 | Bonafous | 251/58 |
| 4,445,424 | 5/1984 | Foster et al. | 92/5 |
| 4,519,575 | 5/1985 | Akkerman et al. | 251/58 |
| 4,523,516 | 6/1985 | Foster et al. | 92/130 |
| 4,549,719 | 10/1985 | Baumann | 251/58 |
| 4,651,970 | 3/1987 | Sadler | 251/63.6 |
| 4,684,103 | 8/1987 | Baumann | 251/58 |
| 4,791,856 | 12/1988 | Heim et al. | 251/63.6 |

Primary Examiner—George L. Walton
Attorney, Agent, or Firm—Vison & Elkins

[57] ABSTRACT

An improved gate valve having a body with a chamber and an inlet and an outlet extending therethrough into said chamber, a gate mounted for reciprocation in said chamber between open and closed positions, a pressure responsive actuator having a housing, a piston, a connection to the gate and an actuating stem extending from the housing, a supplemental actuator having a connection to the actuator housing, an operating stem connected to the actuating stem, the operating stem having a shoulder facing in the direction opposite to the direction of closing movement of the gate, roller levers pivotally mounted to be in engagement with the exterior of the operating stem and a spring urging the roller levers into tight engagement with the operating stem, the roller levers pivoting on engagement with the stem shoulder to exert a closing force on the stem.

11 Claims, 6 Drawing Sheets

GATE VALVE WITH SUPPLEMENTAL ACTUATOR

BACKGROUND

The present invention relates to a gate valve having an attachment which increases the force of closing as the gate approaches the final stages of its closing movement. U.S. Pat. No. 4,519,575 discloses a gate valve having an actuator which utilizes cam surfaces which are engaged by spring loaded cam following carriages and the cam surface is shaped to provide a larger force with the final closing movement of the valve so that it can shear a wire line extending therethrough. The closing force is transmitted from the following carriages to a plate secured to the valve stem. This valve relies entirely on the force from the cam follower for its closing force.

U.S. Pat. Nos. 4,445,424 and 4,523,516 disclose bellows type or Belleville washer type of springs used in actuators for valves.

U.S. Pat. No. 4,651,970 discloses a gate valve suitable for cutting wire line in its closing movement which includes an actuator and an attached energy storage assembly which is compressed in the initial stages of the actuator stroke to open the valve and releases the energy in the final stages of the valve closing stroke. This supplemental closing force is achieved by releasable latch mechanisms which release only near the end of the closing stroke so that the force of the compressed spring of the assembly is added to the actuator's closing force.

SUMMARY

The improved gate valve of the present invention includes a readily attachable assembly which provides relatively no additional force or drag on the operating stem during a substantial portion of the opening and closing of the valve gate but adds a substantial closing force to the stem near the last small portion of the closing movement. The gate valve includes a body having a gate chamber with inlet and outlet passages extending into the chamber, a gate mounted in the chamber for reciprocation therein between open and closed positions, a gate stem connected to the gate and extending beyond the valve body, an actuator mounted on the body and engaging the gate stem to control the reciprocating movement of the gate, an actuator stem extending beyond the actuator, a supplemental actuator having an operating stem releasably secured to the actuator stem, said operating stem having a cylindrical shape over most of its length and a reduced diameter portion near one of its ends, a roller lever being in engagement with the exterior of the operating stem, means biasing said roller lever to exert a substantial axial force on the operating stem as the roller lever engages such reduced diameter portion of the operating stem.

An object of the present invention is to provide an improved gate valve having an operator which provides substantially no increase in the closing force for moving the gate to its closed position during the major length of the stroke and then adds a very substantial closing force during the last short portion of the closing movement of the gate.

Another object is to provide an improved gate valve with a supplemental device for adding substantial closing force for the final closing movement of the gate.

A further object is to provide an improved supplemental actuator which can be easily and quickly installed on a gate valve to provide additional closing force on the gate stem during the final closing movement of the gate.

BRIEF DESCRIPTION OF THE DRAWINGS

These and other objects and advantages of the present invention are hereinafter set forth and explained with reference to the drawings wherein:

FIG. 6 is another sectional view similar to FIGS. 4 and 5 but showing the valve closed.

DESCRIPTION OF THE PREFERRED EMBODIMENT

Figure 1:
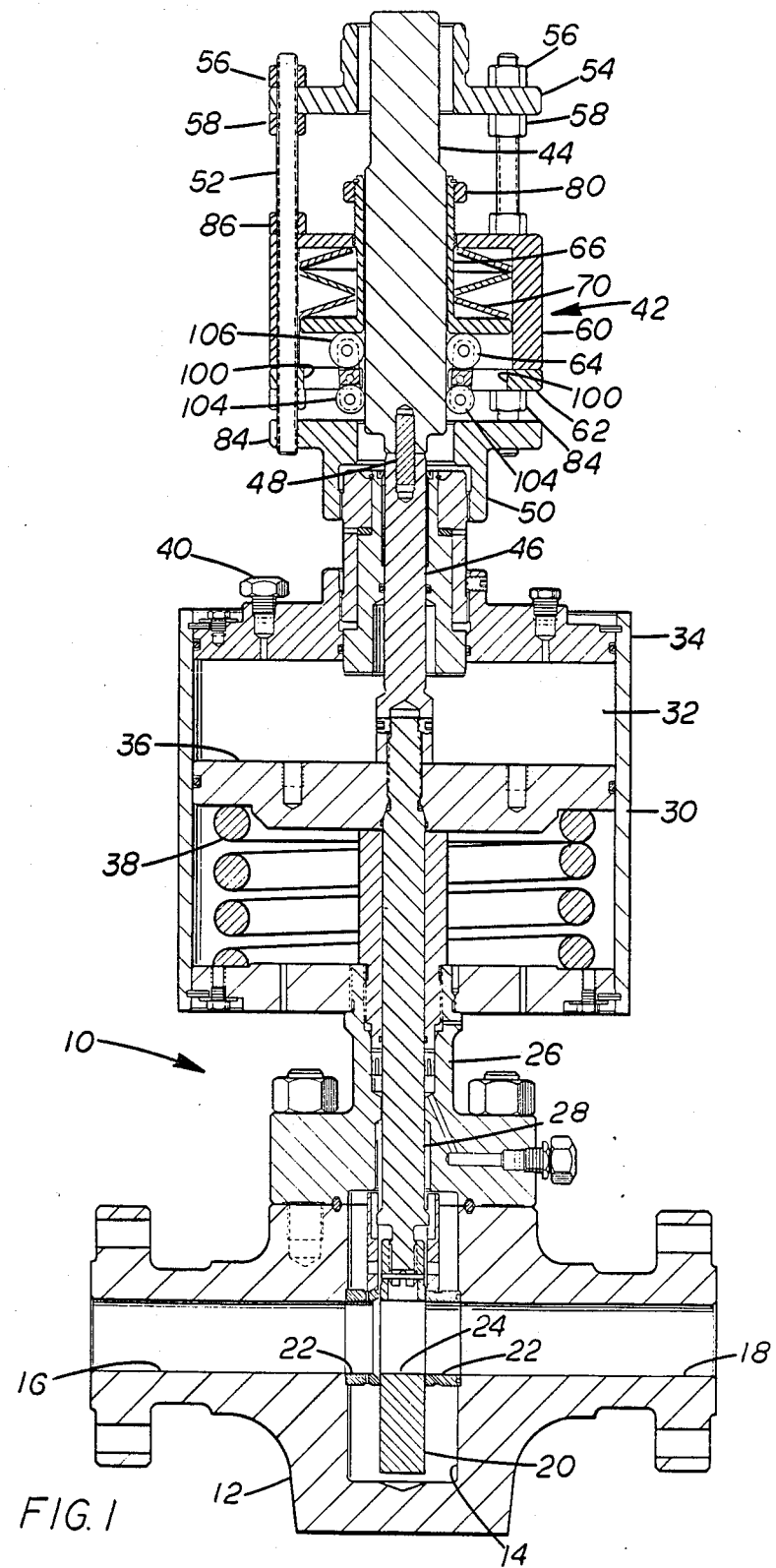
FIG. 1 a sectional view of the improved gate valve of the present invention with the improved supplemental actuator attached thereto and shown in its open position.
Figure 2:
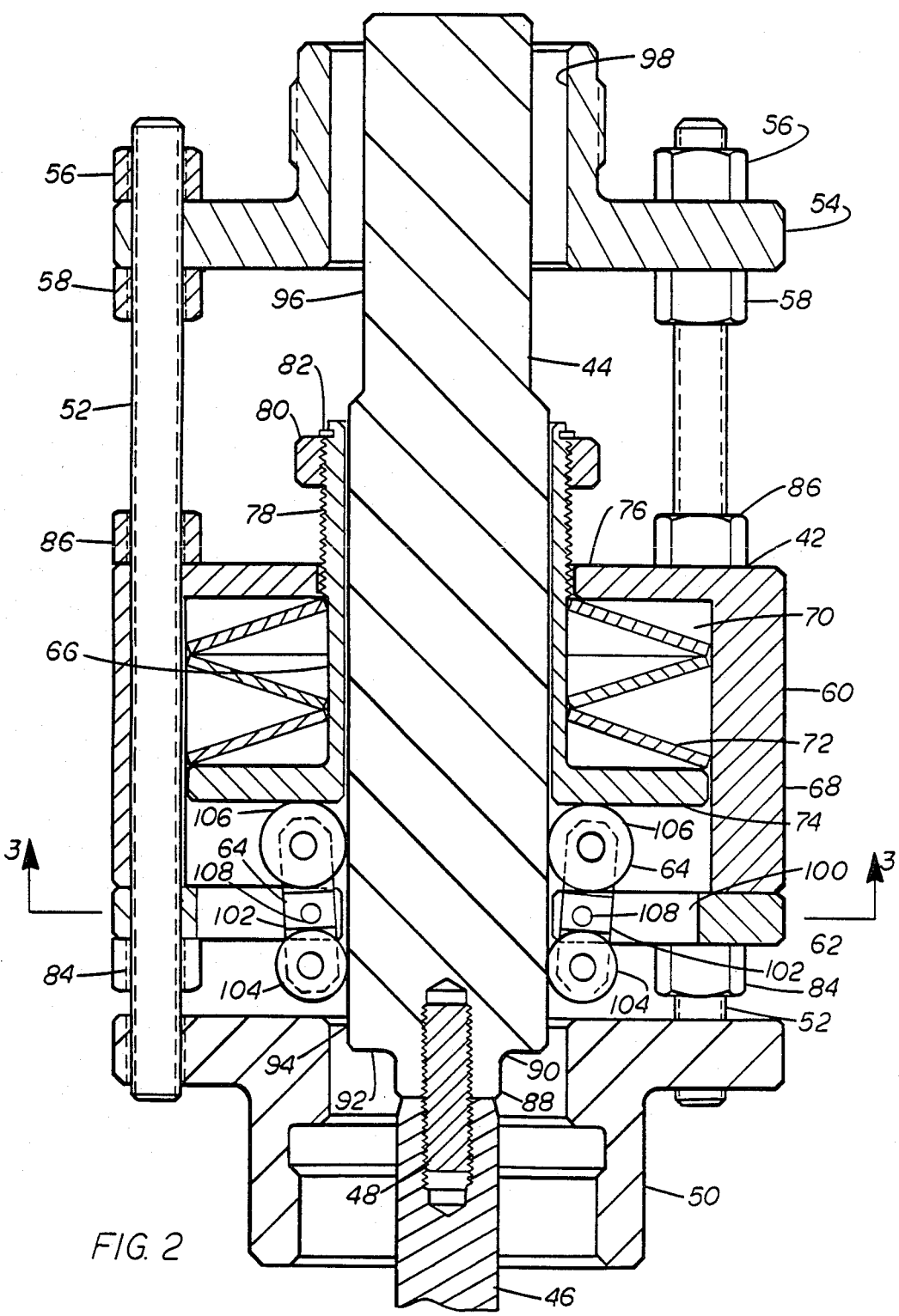
FIG. 2 is a detail sectional view of the improved supplemental actuator.

Valve 10 as shown in FIG. 1 includes body 12 having a valve chamber 14 therein and inlet 16 and outlet 18 in communication through body 12 with the valve chamber 14. Gate 20 is positioned within chamber 14 and bushings 22 are positioned around the openings of inlet 16 and outlet 18 and in engagement with the sides of gate 20. Gate 20 includes opening 24 therethrough which when aligned with inlet and outlet bushings allows flow therebetween and when not so aligned closes flow through the valve 10. Bonnet 26 is secured to body 12 and gate stem 28 extends from gate 20 through bonnet 26 and into actuator 30.

Actuator 30 is a pressure responsive actuator which includes a pressure chamber 32 within housing 34 with piston 36 positioned therein and secured to the upper end of gate stem 28. Spring 38 urges piston 36 in the direction of valve closing. Suitable connections 40 are provided for supplying pressure fluid into chamber 32 to urge the piston in the opening direction and spring 38 provides the force for returning piston 36 in the closing direction during the major portion of its closing stroke and supplemental actuator 42 provides additional closing force during the final increments of the closing stroke to ensure that gate 20 closes even though a wire line may be extending through valve 10.

Figure 3:
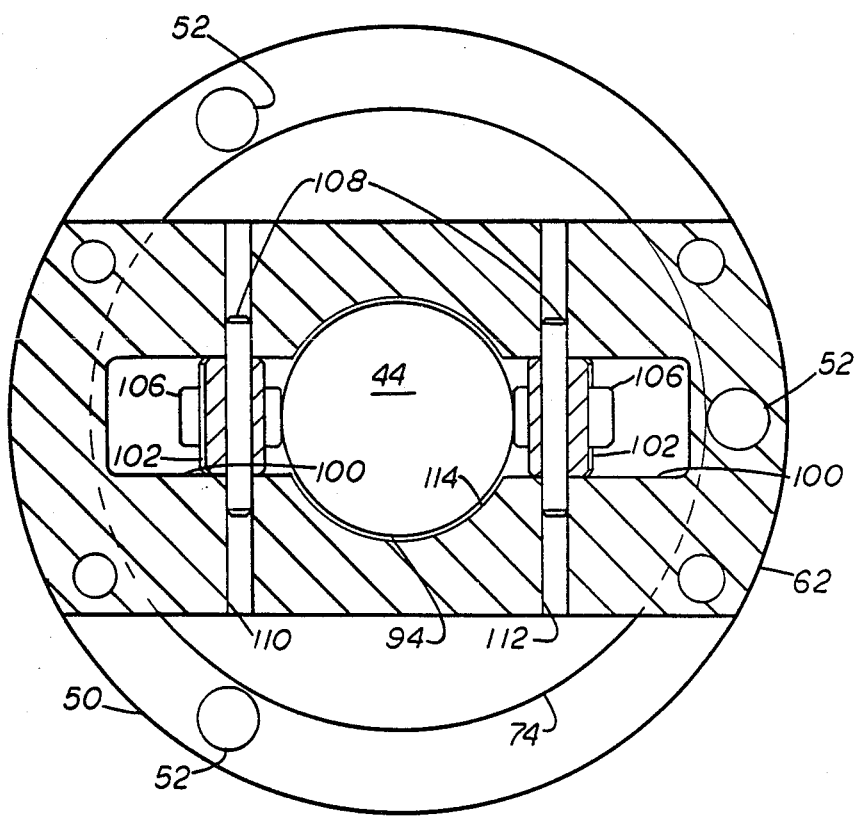
FIG. 3 is a sectional view taken along line 3—3 in FIG. 2.

Supplemental actuator 42 includes operating stem 44 which is secured to the outer end of actuator stem 46 by threaded pin 48. Actuator stem 46 is secured to piston 36 and extends beyond housing 34 as shown. Flange 50 is threaded onto housing 34 and supports supplemental actuator 42 on actuator 30. Studs 52 are threaded into flange 50 and extend and are secured to upper flange 54 by nuts 56 and 58. Carriage 60 includes plate 62 with roller levers 64 mounted thereon as best seen in FIG. 3, inner sleeve 66, outer sleeve 68 and biasing means 70, such as Belleville spring 72. Inner sleeve 66 includes outwardly extending flange 74 and outer sleeve 68 includes inwardly extending flange 76. Biasing means 70 is positioned between flanges 74 and 76 and exerts a force tending to cause sleeves 66 and 68 to move apart.

The upper exterior 78 of inner sleeve 66 is threaded to receive nut 80 and snap ring 82 is secured in sleeve 66 to limit the upward travel of nut 80 once it is installed thereon. Nuts 84 and 86 on studs 52 are provided to secure actuator 42 in the desired position with respect to operating stem 44.

Operating stem 44 has an exterior surface which is specifically designed for coaction with roller levers 64. Its end adjacent to actuating stem 46 has a surface 88 having a diameter substantially the same as the diameter of stem 46. Surface 88 ends in shoulder 92 with a suitable rounding or fillet 90. The outer portion of shoulder 92 rounds into cylindrical surface 94 which extends for a length which is at least as long as the stroke of actuator 30. The end of operating stem 44 above surface 94 is reduced in diameter to surface 96 which has any suitable diameter allowing stem 44 freedom of movement through the bore 98 of flange 54.

As seen in FIG. 3, roller levers 64 are supported in slots 100 in plate 62. Each of roller levers 64 includes arm 102 having small roller 104 mounted on the lower end of arm 102 and large roller 106 mounted on the upper end of arm 102. Each of roller levers 64 is pivotally mounted to plate 62 by pin 108 which extends through an opening in arm 102 and has its ends positioned in holes 110 and 112 extending through plate 62 at each side of slot 100. Plate 62 is provided with opening 114 which is sufficiently large to allow operating stem 44 to pass readily therethrough.

It should be noted that supplemental actuator 42 can be varied so that the amount of force developed for the final closing movement of gate 20 can be increased or decreased. An obvious expedient is to change the spring force exerted by spring 72. It is also possible to change the pivot point of roller levers 64 to exert more or less force on operating stem 44.

Figure 4:
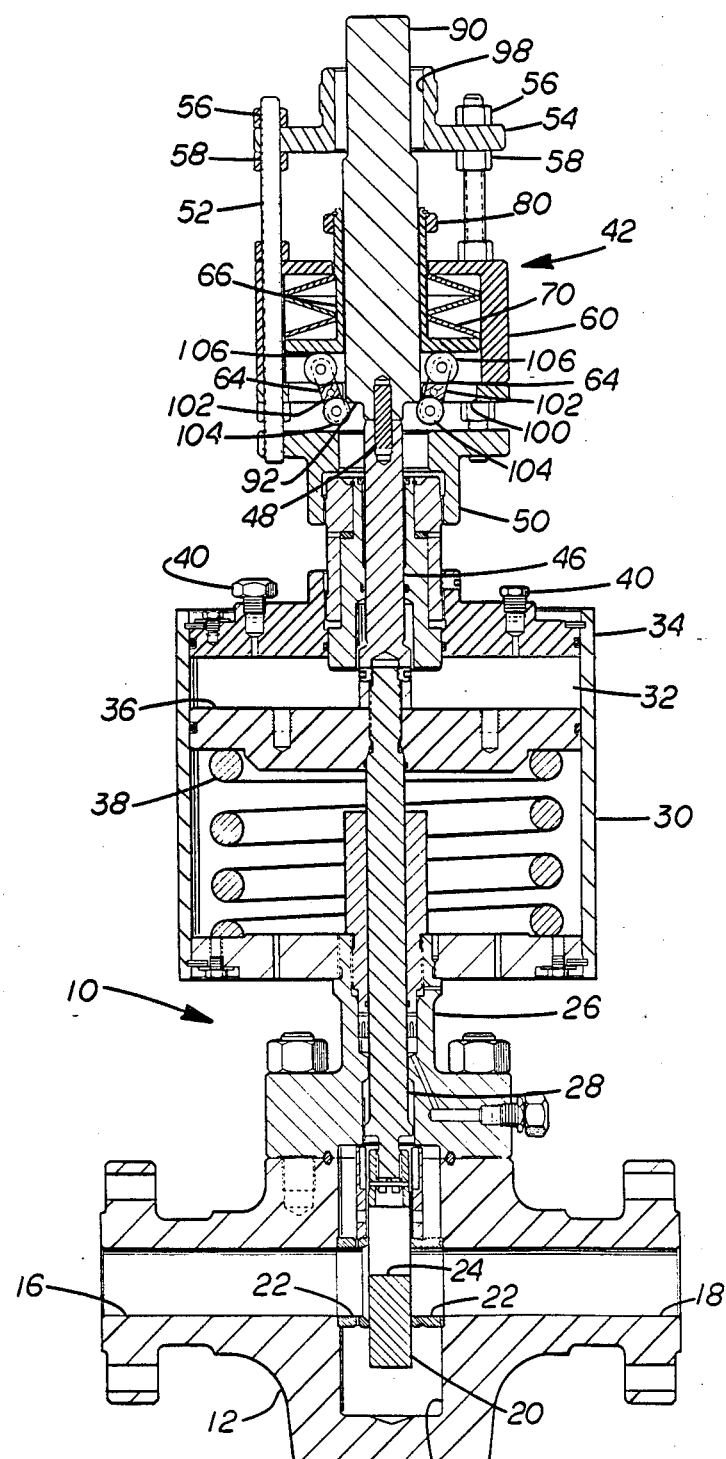
FIG. 4 is a sectional view of the gate valve similar to FIG. 1 but showing the valve nearing the final stages of its closing movement.
Figure 5:
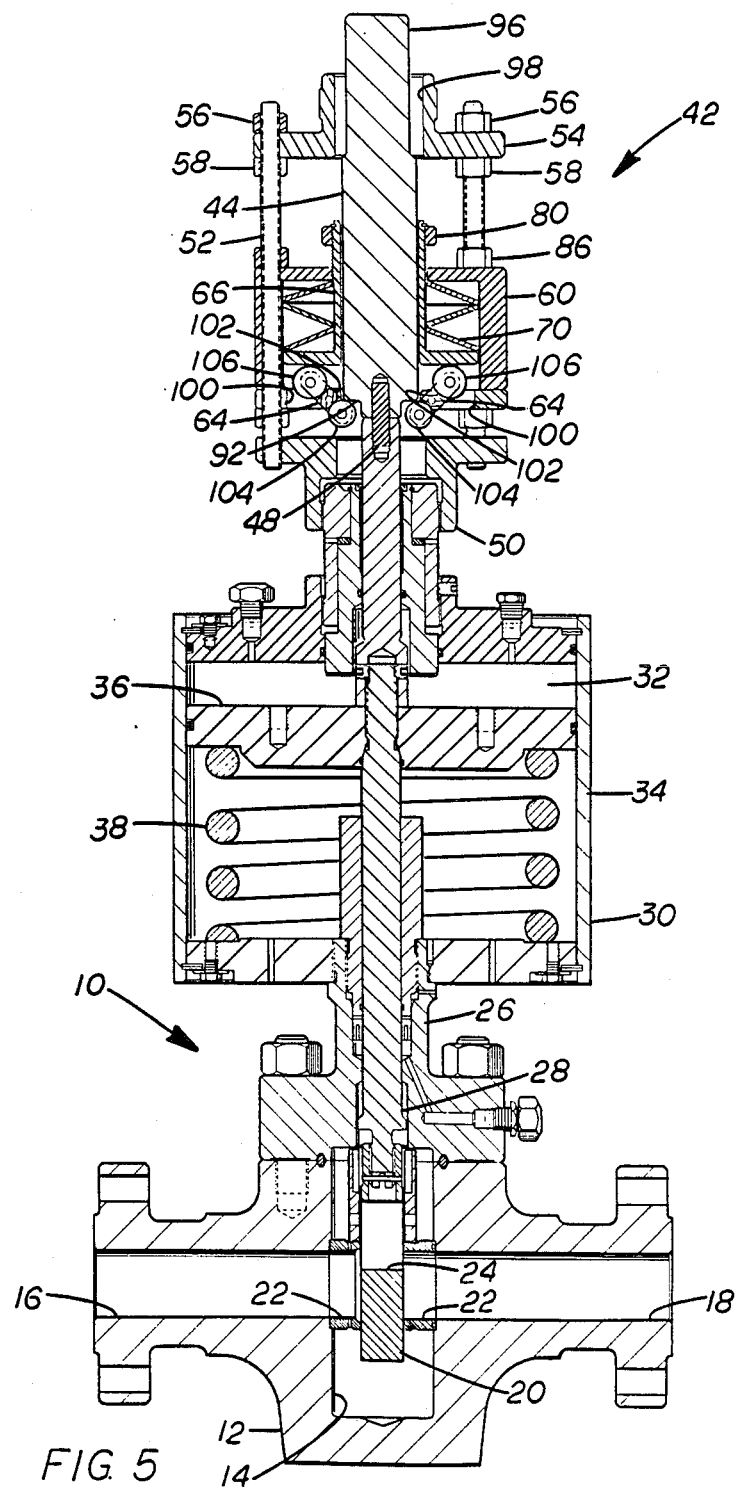
FIG. 5 is another sectional view similar to FIG. 4 but showing the valve in the final stages of its closing movement.

In operation, valve 10 functions similarly to other gate valves with actuator 30 controlling the movement of gate 20 responsive to fluid pressure delivered to chamber 32 and also responsive to the force of spring 38 when fluid pressure is vented from chamber 32. When gate 20 is open and is to be closed the pressure fluid is vented from chamber 32 allowing spring 38 to force piston 36 to move gate stem 28 and gate 20 upwardly as shown in FIG. 4. It should be noted that roller levers 64 are in engagement with cylindrical surface 94 of operating stem 44 so no appreciable drag is exerted on the movement of gate 20 by supplemental actuator 42 resisting either opening or closing movement of actuator 30. As small rollers 104 reach the rounded portion of the intersection between surface 94 and shoulder 92 the force of spring 72 exerted on larger roller 106 is transmitted into an upward force on operating stem 44 by causing levers 64 to pivot about pins 108 so that small rollers 104 engage and transmit the force to shoulder 92. The difference in the size of rollers 104 and 106 positions the transmittal of spring force to pivot levers 64 about pins 108 and into force transmitting engagement with shoulder 92. Further upward movement of operating stem 44 allows small rollers 104 to engage shoulder 92 to exert an even greater force because of the pivoting of arms 102 as shown in FIG. 5. The last portion of the movement of operating stem 44 during the closing of gate 20 is shown in FIG. 6 and the pivoting of lever arms 102 has proceed to provide increased force on shoulder 92 to assist in the final closing movement of gate 20.

What is claimed is:

1. A gate valve comprising
   a body having a chamber with an inlet and an outlet extending through the body into the chamber;
   a gate positioned for reciprocation in said chamber to open and close flow through said inlet and outlet,
   a gate actuator connected to said gate for reciprocating said gate,
   a supplemental actuator including an operating stem, a plurality of levers having rollers positioned to be in contact with the exterior of said operating stem of said supplemental actuator during all of the closing movement of the operation stem except the last portion thereof, and biasing means exerting a force on one of said rollers of each lever, and
   means for connecting said supplemental actuator to said gate actuator so that said operating stem moves with said gate,
   said supplemental operating stem having an external configuration providing a shoulder facing in a direction opposite to the direction of closing movement of said operating stem for engagement by one of said lever rollers during only the last portion of the closing movement of said gate to automatically transmit the force of said biasing means to assist in the closing movement of said gate.

2. A gate valve according to claim 1 including
   means for adjusting the relative position of said levers with respect to said operating stem to ensure the application of the additional closing force to the last portion of movement of the gate in closing.

3. A gate valve according to claim 1 wherein said gate actuator includes
   a housing, and
   an actuating stem extending therefrom,
   said supplemental actuator is supported from said gate actuator housing and said operating stem is secured in end-to-end abutting relationship to said actuating stem.

4. A gate valve according to claim 3 including
   a mounting plate for said supplemental actuator,
   said roller levers are pivotally mounted from said mounting plate, and
   means for adjusting the position of said mounting plate with respect to said operating stem of said supplemental actuator to position said roller levers in their preselected position with respect to the exterior configuration of the operating stem.

5. A supplemental actuator for use with a gate valve having a gate actuator for moving its gate between open and closed positions comprising
   an operating stem having an external configuration including a shoulder facing toward one end thereof,
   means for connecting said one end of the operating stem to the gate actuator for axial movement therewith,
   a lever having rollers,
   means for mounting said lever with its rollers in engagement with the exterior of said operating stem during substantially all of the closing movement of the operating stem except the last portion thereof, and
   means for biasing said lever to urge its roller into tight engagement with said operating stem and to create a substantial closing force on the operating stem when one of the roller of said lever comes into engagement with said operating stem shoulder to automatically transmit the force of said biasing means to assist in the closing movement of said operating stem.

6. A supplemental actuator according to claim 5 including
means for adjusting the position of said lever with respect to said operating stem so that the maximum force exerted thereon is exerted during the final closing movement of the gate of the valve to which said supplemental actuator is connected.

7. A supplemental actuator according to claim 5 including
a flange to connect to support the supplemental actuator from the gate actuator,
a mounting plate,
means for securing said mounting plate from said flange,
means for mounting said lever to said mounting plate.

8. A supplement actuator according to claim 7 including
a second lever with rollers,
means for pivotally mounting said second lever to said mounting plate in position to engage the exterior of said operating stem during substantially all of the closing movement of said operating stem except the last portion thereof and to be engaged by said biasing means.

9. A supplemental actuator according to claim 8 wherein
each of said levers includes rollers positioned at each end thereof and said pivotal mounting of said levers is at a point intermediate said rollers.

10. A supplemental actuator according to claim 8 wherein
said levers are positioned so that one roller transmits force to said operating stem shoulder and the other roller receives the force of said biasing means.

11. A supplemental actuator for use with a gate valve having a gate and a gate actuator with a housing, pressure responsive means and an actuating stem extending from the housing comprising
a flange having internal threads to thread to the exterior of the gate actuator housing in surrounding relationship to the gate actuating stem,
a mounting plate,
means for adjustably mounting said mounting plate with respect to said flange,
an operating stem having an external configuration which includes a shoulder facing in a direction opposite to the direction of closing movement of said operating stem,
means for connecting said operating stem to the end of the gate actuator stem on the exterior of said actuator housing,
a pair of roller levers having rollers at each end thereof,
means for pivotally mounting said roller levers from said mounting plate so that said rollers engage the exterior of said operating stem during substantially all of the closing movement of said except the last portion thereof,
means for biasing said roller levers about their pivotal mounting to automatically exert an axial force on said operating stem shoulder during the last portion of the closing movement of said operating stem.

* * * * *